United States Patent

Bielski et al.

[11] Patent Number: 6,011,263
[45] Date of Patent: Jan. 4, 2000

[54] METHOD AND APPARATUS FOR MEASURING MULTI-PHASE FLOW

[76] Inventors: Roman Bielski, 1308 Sheridan Rd., Coopersburg, Pa. 18036; John Carter, 5005 Riverway, Suite 440, Houston, Tex. 77056

[21] Appl. No.: 08/967,552

[22] Filed: Nov. 10, 1997

Related U.S. Application Data

[60] Provisional application No. 60/058,561, Sep. 11, 1997.

[51] Int. Cl.⁷ ................................................ G01F 1/05
[52] U.S. Cl. ................................................ 250/356.1
[58] Field of Search ......................... 250/356.1, 356.2, 250/259, 260, 269.1, 269.2, 269.3, 269.7, 302, 303, 393, 395

[56] References Cited

U.S. PATENT DOCUMENTS

| | | | |
|---|---|---|---|
| 3,678,273 | 7/1972 | Lewis | 250/303 |
| 4,107,525 | 8/1978 | Hart, Jr. | 250/303 |
| 4,412,174 | 10/1983 | Conlon et al. | 324/700 |
| 4,675,527 | 6/1987 | Asher et al. | 250/393 |
| 4,922,748 | 5/1990 | Hopenfeld | 73/86 |
| 5,543,617 | 8/1996 | Roscoe et al. | 250/259 |

*Primary Examiner*—Constantine Hannaher
*Assistant Examiner*—Albert Gagliardi
*Attorney, Agent, or Firm*—Gunn & Associates, P.C.

[57] ABSTRACT

This invention is related to the measurement of flow rates and component fractions of individual phases of a composite fluid. More particularly, the invention is directed toward apparatus and methods for determining the volumetric flow rate or mass flow of one or more phases of a fluid by measuring the activity of one or more specific radioactive isotopes affected by a specific phase of the flowing fluid stream. Phase isotopes are deposited upon one or more inserts, and the inserts are positioned within the multiphase fluid flow. Each phase isotope is soluble in only one phase of the multi-phase flow. The rate at which each phase isotope is washed from an insert by each specific fluid phase is then measured by detecting the rate of decrease of preferably photon activity from an insert. Phase flow parameters, including volumetric flow rate and mass flow rate, are then determined for each fluid phase from the measured rate at witch the corresponding phase isotope is washed from an insert.

42 Claims, 2 Drawing Sheets

METHOD AND APPARATUS FOR MEASURING MULTI-PHASE FLOW

This application claims the benefit of U.S. Provisional Application No. 60/058,561 filed Sep. 11, 1997.

BACKGROUND OF THE INVENTION

This invention is related to the measurement of flow rates and component fractions of individual phases of a composite fluid. More particularly, the invention is directed toward apparatus and methods for determining the volumetric flow rate or mass flow of one or more phases of a fluid by measuring the activity of one or more specific radioactive isotopes affected by a specific phase of the flowing fluid stream.

Fluid flow meters are used in many areas of industry and commerce. Various nuclear, acoustic, electromagnetic, mechanical and electronic techniques have been used to measure linear flow velocity, volumetric flow rates, and mass flow of fluids containing one, two, or more components or "phases" such as water, natural gas and crude oil. The multiple phase, or "multi-phase" flow meters are especially important to the petroleum industry.

Orifice type flow meters are widely used to measure single phase flow, such as fluids comprising 100% liquid, and are used extensively for 100% gas in the natural gas industry. In orifice flow meters, fluid is forced to flow through an orifice in a plate within the flow conduit, creating a pressure drop across the plate. Orifice flow meters are relatively inexpensive to fabricate and to maintain, and are reliable in many types of field operations. In addition, the physical size of most orifice devices is relatively small. Measures of the differential pressure across the plate, along with flow stream pressure and temperature measurements, are used to compute flow rate using equations well known in the art.

Orifice plates are virtually impossible to use in multi-phase stream flow because of the effect the concentric restriction has on "damming" the liquid flow in front of the plate, and the resulting pooling of liquids downstream of the plate. Little success has been indicated in tests, even of high gas fraction multi-phase flow where the gas and vapors constitute more than 98% of the fluids. Any amount of free liquids corrupts generation of a representative differential pressure, and therefore corrupts the resulting flow calculations from these differential pressure measurements. Liquids change the effective pipe diameter, the orifice diameter, the beta ratio of the orifice meter, the pipe roughness and the shape of the vena contracta, and thus the entire flow equation at spazemotic intervals depending on the relative velocities of the phases. At present, there is no "state-of-the art" software or flow equation that can adequately represent multi-phase flow through an orifice plate, even utilizing any existing type of fractional flow determination device.

The venturi, another inferred flow measurement device utilizing differential pressure, can be used to measure multiphase flow only if an independent measure of the ratio of the phases is made. Furthermore, accurate measures of volumetric flow rates of each phase can be obtained if the linear flow velocities of the phases are the same, or the relative "slippage" of the linear phase flows can be determined, or all phases are forced to flow at the same linear flow velocity at the position which the phase ratio and differential pressure measurements are made. All existing multi-phase flow technology that utilizes an inferred flow measurement from differential pressure is done with some special designs of venturi tubes. All existing multi-phase flow technology that utilizes an inferred flow measurement from differential pressure is done with some special designs of venturi tubes. Virtually all comments made concerning orifice measurements are also applicable to venturi flow measurement.

Positive displacement type flow meters force fluid to flow through a positive volumetric apparatus, and the flow rate of the fluid is determined from the rate of revolution of the meter displacer device. Positive displacement type meters may be used in multiphase flow meters. As with venturi flow meters, independent phase ratio measurements must be made using a variety of technologies. The positive displacement flow meter forces all phases of the flow to move through the meter at the same velocity. Those velocities can change quite readily in slug flow, but both the gas and the liquids are at the same flow rate (velocity) at the moment in time as they pass through the meter. The relative ratio of the liquids and the gas to liquids must be obtained at close to the same time in order to obtain the desired multi-phase flow measurements. Positive displacement meters are more complex than venturi flow meters, are more costly to manufacture and to maintain, and are in general larger in physical size.

Tracers have also been used in prior art multi-phase flow measurements. Various materials, usually referred to as "tracers" or "tags", are introduced into a flowing stream comprising one or more phases. Tracers can be radioactive or stable elements or compounds. Preferably, a specific tracer binds to only a specific phase of the composite flow. Detectors, which respond to tracer concentration, are placed downstream from the point of tracer injection. Measured tracer concentration is then related to the flow rate of the phase which the tracer binds. Usually relatively large amounts of tracer material must be injected into the flowing stream to obtain statistically significant measurements. This is especially a problem if radioactive tracers are employed, since the fluid is essentially contaminated with radioactive material. In addition, and as is the case with venturi flow meters, numerous assumptions must be made and/or numerous additional independent measurements must be made in order to convert measured tracer concentration into multi-phase volume or mass flow measurements.

Separators are widely used in multiple-phase flow measurements. As an example, in the petroleum industry, it is of interest to measure volumetric flow rates of the three fluids produced, namely oil, gas and water. Gravity separators are widely used to separate these three components of differing density, and then the separated components are each drawn from the separator and single phase flow measurements are made on each separated components. Characteristically, separators are physically large, are expensive to construct, require a relatively long period of time for the multiple phases to separate by means of the force of gravity, and require a separate flow meter for each separated phase. In addition, separators have an inherent error because of entrained or solution gas, and carry over from one phase to another. As examples, some water can remain within an oil phase, and gas can remain dissolved within the liquid phases. The test separator is capable of giving definitive answers to three phase flow measurements only if all of the various factors of the three meters measuring the various flows are considered. Such factors include the dump rates for the liquids being five to ten times the average flow rate, the entrained gas in both the water and oil phases expanding as the pressure is lowered going through the separator and meters and thereby over-registering the volume of liquids, liquids being carried through the gas meter by the higher gas velocity and insufficient demisting, and changes in the liquid levels due to slugging which results in insufficient separation. These factors are more often than not disregarded and result in a large percentage of test separator testing on producing wells which overstate the volumes from a nominal 10% to values exceeding 100% when compared to sales volumes. In addition, the test separator requires massive, heavy, costly equipment, significant size and time for complete phase separation, and is certainly not applicable for real time, pipeline measurements where there often are sudden changes in the flow phase composition and the flow regime.

Various two and three phase "in-line" multi-phase flow meters have been developed, especially in the petroleum industry. Relatively accurate three phase "partition" measurements can be made using nuclear, acoustic, electromagnetic and a combination of these technologies. As an example, the well known gamma ray attenuation technique can be used to measure an apparent bulk density of a two phase flow comprising liquid and gas. If the bulk density of each phase is known, the partition or fraction of volumes of liquid and gas can be computed from the measured bulk density. The problem lies, however, in determining accurately the linear flow velocities of each of these phases, which is required to convert the partition measurements into corresponding volumetric flow rates. Various relationships have been developed to calculate the relative or slippage velocity of two phases with respect to a measured third phase, but the calculations are replete with assumptions and arc only as accurate as the often dubious assumptions. In addition, these devices are usually quite complex both electronically and mechanically, are expensive to fabricate, and are very expensive to maintain and to calibrate.

Neutron sources (14 MeV) have been used to irradiate a composite fluid comprising a water component with neutrons thereby inducing $^{16}$N in the water phase by means of the $^{16}$O(n,p)$^{16}$N reaction. This is usually referred to as an "oxygen activation" type measurement. Linear flow rate of the water phase and even the volumetric flow rate of the water phase can be determined, by measuring gamma radiation resulting from $^{16}$N, which is completely independent of the volumetric flow rates of any other non-oxygen phase of the composite stream. Since the half life of $^{16}$N is only approximately 6.2 seconds, long term contamination of the fluid does not present a problem. The method yields only flow parameters of the oxygen bearing phase. As an example, fluid produced from oil and gas wells usually comprises oil, water and gas. The neutron activation technique can be used to obtain volumetric flow rate of the water phase only. Since neither the gas or oil phases contain oxygen, no information is obtained concerning the flow of these phases.

To summarize the prior art in multi-phase flow measurements, especially as they pertain to the petroleum industry, no effective and direct techniques are available to measure two or three phase flow in a pipeline that do not exhibit limiting features discussed above. The test separator is capable of giving definitive answers to three phase flow measurements only if all of the various parameters of the previously mentioned three meters measuring the various flows are considered. Other limiting factors of test separator methodology include the dump rate for the liquids being 5 to 10 times the average flow rate, the entrained gas in both the water and the oil expanding as pressure is lowered going through the meter and over-registering the volume of liquids, liquids being carried through the gas meter by the higher velocity and insufficient demisting of this phase, and changes in liquid levels due to the slugging resulting from insufficient separation. These items are more often than not disregarded, thereby resulting in a large percentage of test separator testing on producing wells which overstates the volume ranging from a nominal 10% to values in excess of 100% when compared with sales volumes. As mentioned previously, the test separator technique requires massive, heavy, costly equipment, significant time for complete phase separation, and is certainly not applicable for real time, pipeline measurements where there are often sudden changes in the flow phase composition and flow regimes.

An object of the present invention is to provide multi-phase apparatus and methods to measure volumetric flow rate of one or more phases of a composite fluid, wherein no assumptions are needed concerning the linear flow velocities or the slippage velocities of the multiple phases.

Another aspect of the present invention is to provide a multi-phase flow measurement system for the petroleum industry, wherein volumetric flow rates of water, oil and possibly gas phases of produced fluids are measured directly, in real time, in a fluid stream flowing within a pipeline.

Still another object of the present invention is to provide accurate and precise measures of multiple phases of a fluid flow.

An additional benefit of the invention is to provide a multi-phase flow measurement system which is based upon the measure of radioactive levels, wherein the measuring equipment is extremely accurate and precise thereby allowing the use of very small or "exempt" quantities of radioactive materials which present no human or environmental hazards.

Another value of the present invention is to provide multi-phase flow measurement apparatus which is reliable, inexpensive to manufacture, inexpensive to operate AND suitable for rugged field use.

Still another object of the invention is to provide suitable calibration apparatus and methods with which the multi-phase flow system can be calibrated, where the invention, properly calibrated, can also serve as a calibration device for other types of multi-phase meters and test separators.

There are other objects and applications of the invention that will become apparent in the following disclosure and appended claims.

SUMMARY OF THE INVENTION

The present invention is based upon the selection of a radioactive element or compound which is soluble in only one phase of a multi-phase fluid, depositing this element or compound onto an insert, placing the insert into a flowing stream which comprises the soluble phase, measuring the rate which the deposited element or compound is "washed" away from the insert by the phase in which it is solvent, and determining the flow rate of the solvent phase from the measured characteristic radiation. The rate at which radioactive material is washed away is measured by detecting characteristic radiation from that material over a period of time.

The invention will be summarized by using, for purposes of discussion, a multi-phase fluid consisting of oil, water and gas. It should be understood, however, that the methods and apparatus of the invention are equally well suited for measuring multi-phase flow in fluids comprising other phases of liquid and gas, as long as (1) a radioactive element or compound which is solvent only in one phase can be deposited on the insert, and (2) the radioactive element emits characteristic radiation which can be quantitatively detected with the detection equipment of the invention. For purposes of brevity, the radioactive isotopes which are soluble in a given flow phase will simply be referred to as phase soluble isotopes, or "phase isotope".

In measuring the flow rate of the water phase of the example, a water soluble isotope is selected and deposited on a "water phase" insert. The insert is positioned within the flowing multi-phase liquid. A level or activity of radiation, which is characteristic of the decay of the water soluble isotope, is measured as a function of time. As the water flows past the insert, water soluble isotope is removed or "washed" from the insert by the passing water phase. This results in a decrease in measured activity of the characteristic radiation. The rate at which water soluble isotope is washed from the insert is a function of the volumetric flow rate of the water phase. The greater the volumetric flow rate of water, the greater the rate at which water soluble isotope is removed or washed from the insert. The rate at which water soluble isotope is washed from the insert is solely a function of the water flow rate, and is not a function of oil or gas flow rate since these phases do not wash water soluble isotope from the insert. Water flow rate is calculated from the change in measured radiation characteristic of the decay of water soluble isotope. The measurement is quantified by depositing a known amount of isotope upon the insert, and calibrating the system by measuring radiation change as a function of time with a known amount of water flowing through the system. This calibration procedure will be discussed in detail in a subsequent section.

Methodology for measuring flow of the water phase of the multi-phase fluid is also used to measure the oil phase of the fluid. More specifically, an oil soluble isotope is deposited on a second insert or "oil phase" insert, which is inserted into the fluid flow in the vicinity of the water phase insert. The oil soluble isotope emits characteristic decay radiation which is different and measurably distinguishable from radiation emitted by the water soluble isotope. The flow of oil past the oil phase insert washes or removes only oil soluble isotope, since this isotope is not soluble in water or gas. The rate of change in radiation from the oil soluble isotope is indicative of the magnitude of the oil phase flow. Preferably a single radiation detector with sufficient energy resolution and precision is used to measure radiation as a function of time from both the oil and water soluble isotopes. The oil phase flow measurement is quantified by depositing a known amount of oil soluble isotope upon the oil phase insert, and calibrating the system by measuring the change in radiation from the decay of the oil soluble isotope as a function of time with a known amount of oil flowing through the system.

Again, the same methodology is also used to measure the gas phases of the fluid. A gas soluble isotope is deposited on a third insert or "gas phase" insert which is inserted into the fluid flow in the vicinity of the water and oil phase inserts. Only flow of the gas phase washes gas soluble isotope from this insert. The corresponding change in characteristic radiation from the decay of the gas isotope is measured, again preferably using the same detector used to make the water and oil isotope measurements. This change is related to quantitative gas phase flow using previously discussed system calibration techniques.

In summary, three isotopes are selected which emit measurably distinct decay radiation and which are soluble in only one phase of a multi-phase fluid. Each isotope is deposited on an insert and placed in the fluid flow. Each fluid phase washes away its corresponding isotope depending upon the magnitude of the phase flow. The measured chance in the activity of each phase isotope can, therefore, be related to the volumetric flow rate or the mass flow of the phase.

For purposes of illustration, it has be assumed that the half lives of the phase isotopes are relatively long with respect to the flow measurement, therefore any decrease in measured intensity of radiation characteristic of a phase isotope is due to the washing away of that isotope by the flowing phase, and not due to the exponential decay of that isotope. This assumption is not necessary for the invention to work properly, and shorter half life isotopes can be used as will be illustrated in a subsequent section.

BRIEF DESCRIPTION OF THE SYSTEM

The multi-phase flow system comprises one or more inserts which are positioned within the flowing fluid stream, one or more radioactive isotopes which emit particles or photons of characteristic energy and which are deposited on the inserts and each of which is soluble in only one flow phase, a photon detection system for measuring the activity levels of the one or more phase isotopes, a computer for converting measured phase isotope levels into volumetric flow rate and mass flow of the phases, and a suitable form to output the computed parameters of interest.

Membranes of various types have been used in the prior art to filter or trap various components within gaseous or liquid flow streams. There has been rapid growth in the membrane industry, and these materials have been used to remove toxic substances from industrial gas, removal of specific ions from waste waters, and many other applications. The present invention uses membranes as inserts, and this application is essentially opposite from prior art membrane applications. Phase isotopes are absorbed or adsorbed onto preferably separate membrane inserts. The phases of the fluid flow then wash away their corresponding isotopes at a rate proportional to the mass of the phase flow which contacts the membrane. As stated previously, a given phase isotope is insoluble in any other phases within the flow. Inserts other than membranes, such as metal plates, can alternately be used for insert materials.

Phase isotopes are selected based upon several criterion. The isotopes must be elements, or compounds, or elements or compounds bound in a carrier material, which is solvent in only one phase of the multi-phase flow. It is also desirable that the isotope exhibit a relatively long half life for both technical and operational reasons. Technically, if the half life is long with respect to the multi-phase flow measurement, it is not necessary to "correct" the measured isotopic phase activity levels for exponential decay. Operationally, long half life phase isotopes are desirable so that they can be deposited on inserts, transported, and stored for long periods of time before use. It is also highly desirable for phase isotopes to emit at least two coincident photons of characteristic energy upon decay. Characteristic energies are used to identify multiple phase isotopes with a single detector. Multiple photon emission allows multiple photon detection (MPD) techniques to be used which are very sensitive. This, in turn, allows relatively small or "exempt" amounts of phase isotopes to be deposited on the inserts, thereby essentially eliminating the possibility of polluting the flow stream with radioactive material washed away by the respective flow phases.

The radiation detector is preferably a multiple photon detection (MPD) system which detects only the emissions of two or more coincident photons from the phase isotopes, an rejects any other detected photon activities as background. As an example, the MPD system can comprise a gamma ray detector and an x-ray detector for detecting decay events from phase isotopes which emit coincident gamma and X rays. Alternately, the MPD detection system can comprise two gamma ray detectors positioned at 180 degrees with respect to one another, where coincident 511 KeV annihilation gamma rays are detected resulting from a phase isotope which decays by positron emission. The use of a MPD system allows low level amounts of tracer isotope to be used thereby minimizing risk to humans and the environment by polluting the flowing fluid with significant amounts of radioactive material.

Detector response in input into a computer where it is processed in order to obtain the desired flow parameters of the phases within the liquid stream. As mentioned briefly, the rate of decrease in activity of a specific phase isotope varies inversely with the mass flow of that phase. A linear inverse proportionality is desired, but not necessary to practice the invention. Data analysis will be discussed in detail in a subsequent section.

Once the desired phase flow parameters have been computed, they are output by the computer to a suitable storage device such as a disk, and simultaneously printed in tabular form. In addition, the computer output preferably includes a visual display which can be easily viewed by the operator of the system.

BRIEF DESCRIPTION OF THE DRAWINGS

So that the manner in which the above recited features, advantages and objects of the present invention are attained and can be understood in detail, more particular description of the invention, briefly summarized above, may be had by reference to the embodiments thereof which are illustrated in the appended drawings.

It is to be noted, however, that the appended drawings illustrate only typical embodiments of the invention and are therefore not to be considered limiting of its scope, for the invention may admit to other equally effective embodiments.

DETAILED DESCRIPTION OF THE PREFERRED EMBODIMENT

Figure 1:
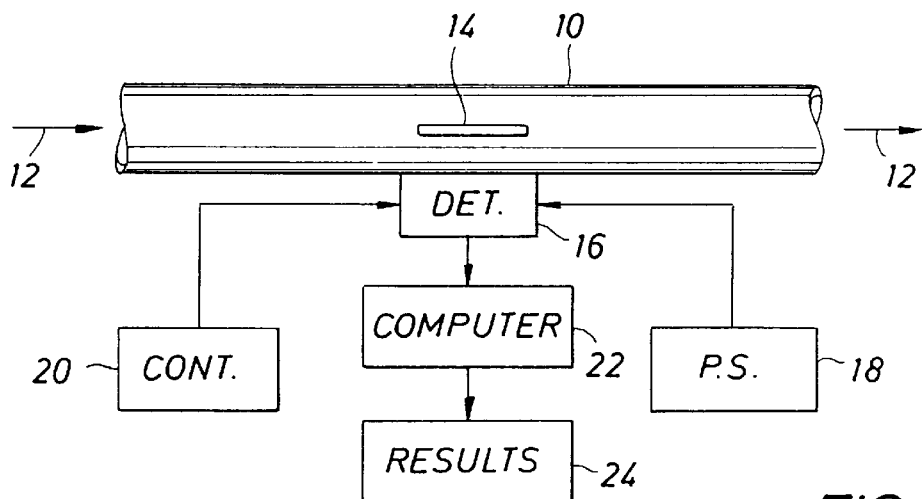
FIG. 1 illustrates the major components of the multi-phase flow system configured to measure flow characteristics of one phase in the presence of other phases.

Attention is directed to FIG. 1 which illustrates the primary elements of the multi-phase flow system. For purposes of illustration, it will initially be assumed that the system is configured to measure only one phase of the multi-phase fluid, illustrated conceptually by arrows 12, and flowing within a pipe 10.

Still referring to FIG. 1, a single membrane insert is depicted conceptually and identified by the numeral 14. It has been found that the use of membranes in the form of standard strainers is not practical because this geometry significantly perturbs the flow, and the phase isotope is not washed off of the membrane by the corresponding phase in a manner indicative of true phase flow. These problems are minimized by positioning the membrane 14 essentially parallel to the flow 12. It may, however, be advantageous to position the membrane 14 at a small angle with respect to the direction of the flow 12 and to thoroughly mix or condition the stream just prior to the membrane to eliminate any inconsistencies due to stratified or segmented flow. Membranes 14 made of nylon, paper, acrylic polymer and ceramic material, commercially supplied by Whitman, Amersham and Millipore, have been used in the system. The preferred membrane material is Nafion supplied commercially by DuPont. In selecting a suitable membrane material, consideration must be given to the miscellaneous mechanisms of membrane action, the physical and structural characteristics, and materials from which it is made. Membrane technology is summarized in *Membrane Processes*, R. Rautenbach and R. Albrecht (translated by V. Cottrell), John Wiley & Sons, New York, 1991, and *Inorganic Membrane synthesis, Characteristics and Applications*, R. R. Bhave, Van Nostrand Reinhold, New York, 1991.

A suitable phase isotope must be selected for deposition on the membrane 14. Prospective isotopes must be elements, or compounds, or elements or compounds bound in a carrier material which is solvent in only one phase of the multi-phase flow 12. It is also desirable that the isotope exhibit a relatively long half life for both technical and operational reasons. Technically, if the half life is long with respect to the multi-phase flow measurement, it is not necessary to "correct" the measured isotopic phase activity levels for exponential decay. Other factors, such as regulations and the like, may prevent long half life material, regardless of concentration, from being input onto the flowing stream. Operationally, long half life phase isotopes are desirable so that they can be deposited on inserts, transported, and stored for long periods of time before use. A total wash out time of the phase isotope has been found to be as short as 10 to 20 minutes. It is desirable, therefore, for the half life of the phase isotope to be least greater than 10–20 hours, and for operational purposes, preferably greater than 40–50 days. As mentioned previously, it is also highly desirable for phase isotopes to emit at least two coincident photons of characteristic energy upon decay. Characteristic energies are used to identify multiple phase isotopes with a single detector, and to trigger coincident counting detectors. Multiple photon emission allows multiple photon detection (MPD) techniques to be used which are very sensitive. This, in turn, allows relatively small or "exempt" amounts of phase isotopes to be deposited on the inserts, thereby essentially eliminating the possibility of polluting the flow stream with radioactive material washed away by the respective flow phases. More than 100 isotopes are compatible with MPD requirements. A list of suitable phase isotopes is presented in U.S. Pat. No. 5,532,122 to Andrzej K. Drukier, which is hereby entered in this disclosure by reference.

Sodium-22 ($^{22}$Na) meets the stated criteria for a phase isotope and will be discussed in detail as an example. The half life of $^{22}$Na is 2.58 years, and is commercially available in the form of water solutions of its chloride. The isotope can also be used as an oil soluble phase isotope, but the following example will describe the deposition of a water soluble isotope. The radioactive material is preferably adsorbed on the membrane 14 to yield a total activity of approximately 40 nanoCuries (nCi), or alternately within the preferred range of 25–50 nCi. If the available radioactive source contains 1 μCi in 5 milliliters (mL), about 200 mL of solution is absorbed on the membrane and evaporated under the flow of air at room temperature.

Again referring to FIG. 1, the activity on the membrane 14 is measured preferably with a MPD detector 16 positioned against the outer wall of the pipe 10 and aligned with the membrane 14. A control circuit 20 controls the coincidence counting of the detector 16, and pulse shape discrimination and background rejection as disclosed in the previously referenced U.S. Pat. No. 5,532,122 to Andrzej K. Drukier. The detector 16 is also powered by suitable power supplies 18. Activity of the phase isotope ($^{22}$Na in this example) on the membrane 14 is measured as a function of time and input into a computer 22. The computer processes these data using methodology to be discussed in the following section, and outputs the desired phase flow parameters in the form of results 24 which can be printed tabulations or any type of memory unit.

As mentioned previously, the system depicted in FIG. 1 is configured to measure only one phase in the multi-phase flow 12, and in the previous example, the phase isotope was selected to measure the water phase. $^{22}$Na can also be incorporated as an oil soluble phase isotope. Other isotopes such as $^{60}$Co can be used as water or oil phase isotopes, if the isotope is in a compound or in a material which is solvent only in the desired fluid phase. Gas phase isotopes can comprise krypton or xenon isotopes, where the license exempt levels of these activities is relatively high. The use of some noble gas radioisotopes as gas phase isotopes requires operation of the MPD detector 16 in a non-coincidence mode since some isotopes do not decay by the emission of two or more coincident photons. There are noble gas isotopes that provide the coincident photons.

Still referring to FIG. 1, the radiation detector 16 is preferably a MPD system which detects only the emissions of two or more coincident photons from the phase isotopes, an rejects any other detected photon activities as background. As an example, the MPD detector system 16 can comprise a gamma ray detector (not shown) and an X ray detector (not shown) for detecting decay events from phase isotope deposited on the membrane 16 which emit coincident gamma and X rays. Such a system is disclosed in detail in U.S. Pat. No. 5,532,122 to Andrzej K. Drukier which was previously entered by reference. Gamma rays are detected preferably with an inorganic scintillator such as NaI or CaF$_2$ crystals. Coincident X rays are preferably detected using a Ge semiconductor detector which is optimized for detection of X rays. Suitable coincident circuitry is provided in the control circuitry 20, and background rejection criteria are disclosed in detail by Drukier. Background is further reduced by the use of collimated, graded shielding (not shown in FIG. 1). Alternately, the MPD detection system 16 can comprise two gamma ray detectors (not shown) positioned at 180 degrees with respect to one another, where coincident 511 KeV annihilation gamma rays are detected resulting from a phase isotope which decays by positron emission. The detector 16 can be operated in a non-coincidence mode, and the phase activity can be measured solely by detecting photon emission at one or more characteristic energy. This mode of operation is required in detecting the previously mentioned gas phase isotopes. The signal to noise ratio of such a system would be considerably greater than that of the detector operating in the coincidence mode, and would require the use of more gas phase isotopic material to obtain statistically significant phase flow measurements.

DATA PROCESSING

The processing of the measured change in phase isotope activity, and how this measurement is related to flow parameters of that phase, will be presented for a single phase flow. This methodology applies to two or more flows, with the only difference being that different isotopic activities are measured for different phases.

Figure 2:
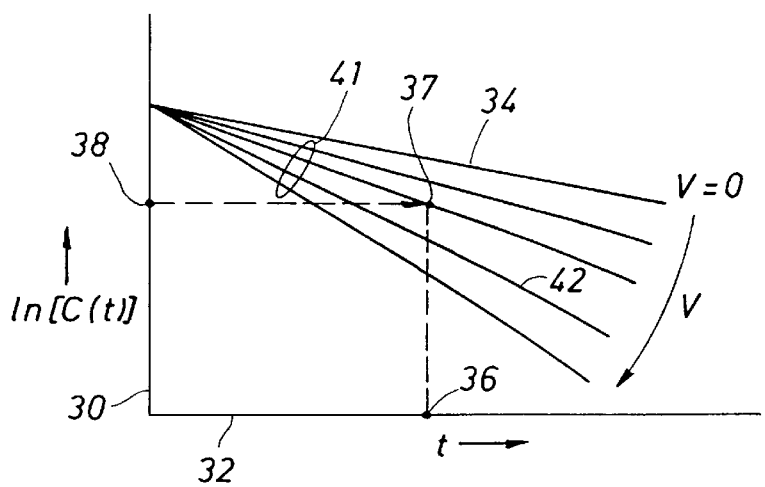
FIG. 2 illustrates a graphical solution for the volumetric flow rate of a single phase, where the half life of the phase isotope is relatively short.

FIG. 2 illustrates a plot of the natural logarithm of the measured activity of a phase isotope, C(t), measured as a function of time t, and plotted as a function of t for various phase volumetric flow rates V. The quantity ln[C(t)] is plotted along the ordinate 20, and t is plotted along the abscissa 32. If there is no phase flow, then V=0 and ln[C(t)] will illustrate a normal exponential decay as illustrated by the curve 34. If phase flow exists, the measured quantity ln[C(t)] will decrease more rapidly in time with increasing V, since additional phase isotope is being washed from the membrane by the phase flow. This effect is illustrated graphically by a family 41 of constant volumetric flow curves V, which exhibit greater slope with increasing V. A graphical solution for the quantity of interest V in terms of the quantity C(t), measured at time t, is illustrated in FIG. 2. More specifically, the value 38 of ln[C(t)] is obtained from the response of the detector 16 at a specific time 36. Orthogonal extensions from these points intersect at a point indicating that the volumetric flow rate of the phase is the value represented by the curve 42. The family of curves 41 shown in FIG. 2 can be expressed mathematically as (1) $C(t) = C_0(V,t) e^{-\lambda t}$ where λ is the decay constant of the phase isotope, and $C_0(V,t)$ is a term which is a function of the activity originally deposited on the membrane 16, the volumetric flow rate V past the membrane 16, and the time t for which the phase has been washing phase isotope from the membrane. It should be understood that V is computed from C(t) and t using the computer 22, and the graphical solution is presented only for purposes of illustration.

As mentioned previously, it is desirable to select a phase isotope with a half life much greater than the time required to make the phase flow measurement. Such a selection in illustrated in FIG. 3 where C(t) is plotted on the ordinate 52 as a function of t along the abscissa 54. The curve 50 is a straight, horizontal line representing a no flow situation where V=0. Stated mathematically, (2) $C(t) \approx C_0(V,t)$ where, for V=0, $C_0(V,t)$) is a constant. Flowing conditions are represented by the family 61 of constant volumetric flow rate curves. It has been found that the phase isotope can be deposited on the membrane 14 such that the decrease in C(t) with t is approximately linear, and the slopes of the constant V curves increase with increasing V. The graphical solution is similar to the solution illustrated in FIG. 2. Specifically, a value 58 of C(t) is measured at a time 56, and orthogonal extensions from these points intersect at a point 57 which falls on the constant velocity curve 60.

Figure 3:
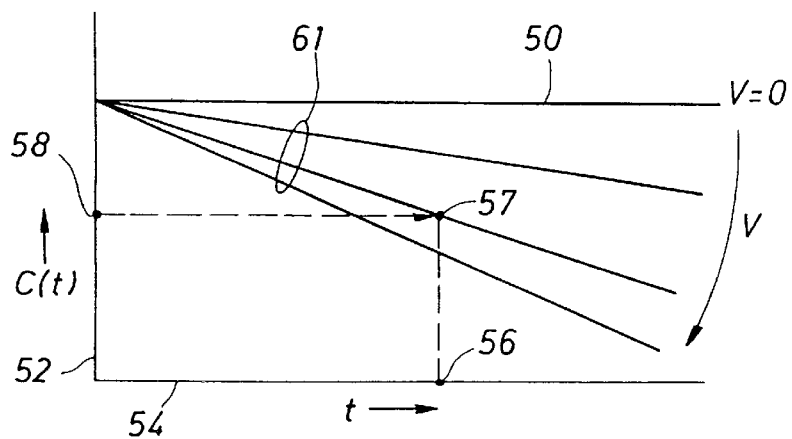
FIG. 3 illustrates a graphical solution for the volumetric flow rate of a single phase, where the half life of the phase isotope is relatively long.

The examples illustrated in FIGS. 2 and 3 assume that the volumetric flow rate V remains constant throughout the phase measurement process. This is often not experienced in actual use of the system. Phase flow can change significantly and rapidly during the flow monitoring process. Such an example is illustrated in FIG. 4 where again, C(t) is plotted as a function of t and the family of curves 91 again represents curves of constant volumetric flow rate V. Also, the phase isotope has been selected such that $C(t) \approx C_0(V,t)$. From time t=0 to t=$t_1$, the measured values of C(t) are represented by data points 81 which fall along a curve 80.

Figure 4:
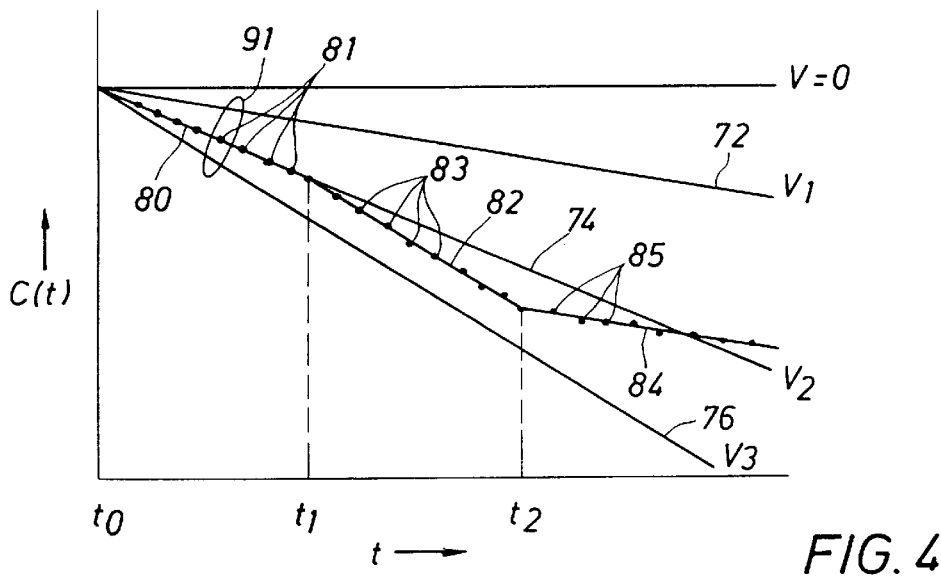
FIG. 4 illustrates a graphical solution for volumetric flow rate of a phase, where the volumetric flow rate is changing during the time interval of the measurement.

During this time interval, the volumetric flow rate of the phase is that represented by the curve 74 and will be denoted as $V_1$. During the time interval $t_1$ to $t_2$, measured data points 84 depart the curve 74 and fall along a curve 82 which is parallel to a constant volumetric flow rate curve 76. The volumetric flow rate of the phase during this interval is, therefore, the value represented by the curve 76 and will be denoted as $V_2$. At the time interval $t>t_2$, the volumetric flow rate of the phase again changes, and measured data points 85 fall along a curve 84 which parallels a constant volumetric flow rate curve 72. The volumetric flow rate at $t>t_2$ is, therefore, represented by the curve 72 and will be denoted as $V_3$. In summary, FIG. 4 illustrates graphically how the system can measure changing phase flows. The flow rate changes three times, and the magnitudes of each flow, $V_1$, $V_2$, and $V_3$, are determined. Again, the graphical solution only illustrates the solution concept. The mathematical solution is obtained with the computer 22 using the measured data C(t) and known corresponding times.

It is noted that the families of constant volumetric flow rate curves 41, 61, and 91 do not exhibit absolute volumetric flow rate values. These absolute values are obtained by measuring values of C(t) as a function of t for known volumetric flows of the phase passing through the pipe 10.

Figure 5:
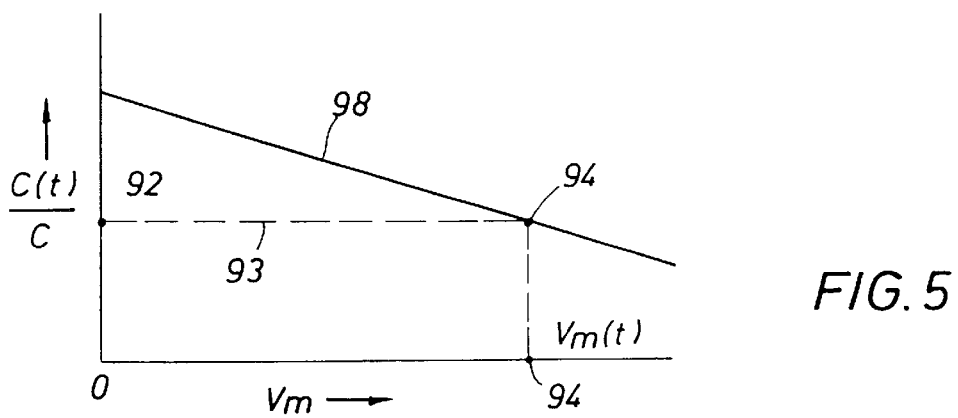
FIG. 5 illustrates a graphical solution for mass flow rate of a phase.

The invention can also be used to determine cumulative mass flow of a phase past the membrane 14 as a function of time t. FIG. 5 illustrates a plot of the ratio C(t)/C as a function of $V_m(t)$, where C is the activity of the phase isotope measures at t=0, C(t) again represents the measured activity of the phase isotope at time t, and $V_m(t)$ is the cumulative mass flow of the phase past the membrane 14 from the beginning of the measurement (t=0) to time t. The curve 98 represents a system calibration curve, which is again determined by flowing known phase mass flows through the system for known periods of time. FIG. 5 illustrates a graphical solution for $V_m(t)$. First, the activity C is measured by means of the detector 16 at the beginning of the measurement (t=0). Next, the activity C(t) is measured at time t by means of the detector 16. The ratio C(t)/C is formed giving a value represented by point 92. A horizontal line 93 is extended from the point 92 until it intersects the calibration curve 98 at point 94. A vertical line is then drawn from the point 94 until it intersects the abscissa thereby yielding $V_m(t)$, the cumulative mass flow past the membrane 16 from the start of the measurement until the time t. It should be noted that this measure of $V_m(t)$ is independent of any phase flow changes that might occur during the time t. Again, as in previous examples, the graphical solution is presented to illustrate a concept, and the actual mass flow solution is obtained by means of the computer 22.

MEASUREMENTS OF MULTIPLE PHASES

Figure 6:
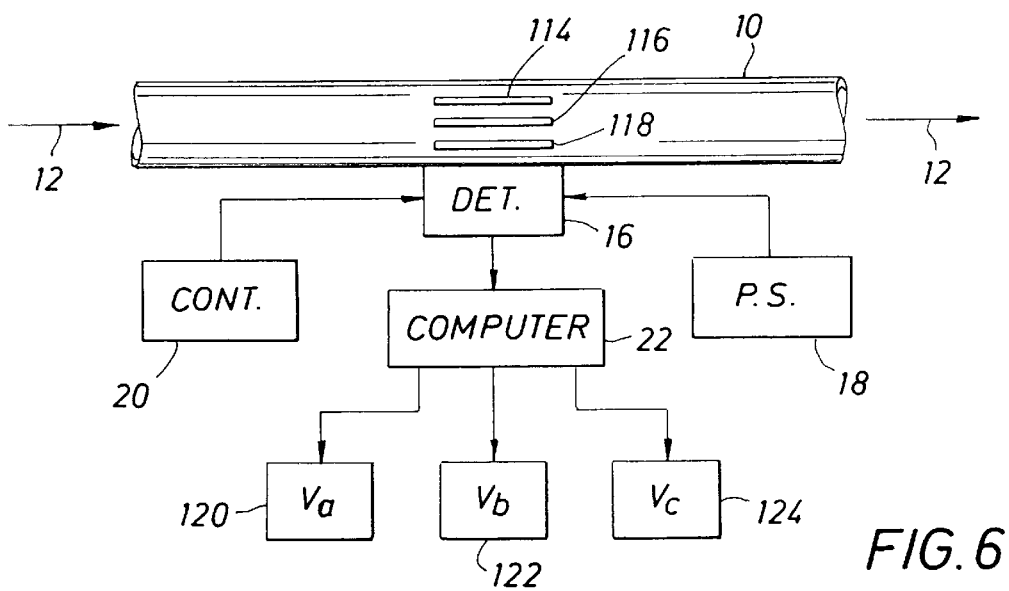
FIG. 6 illustrates the multi-phase flow system configured to simultaneously measure flow parameters for three phases of a fluid.

The previous examples have been limited to determining flow parameters of only one phase of a multi-phase fluid. FIG. 6 illustrates the system configured to measure flow parameters of three phases, such as water, oil and gas, of the flowing fluid 12. Each of three membranes 114, 116, and 118 contains a phase isotope whose decay activity can be readily resolved with the single detector 16, and which is soluble in only one phase. An alternate embodiment of the invention assigns a separate detector to measure the activity of each phase isotope. Activities from the three isotopes as a function of time are measured as the flow phases wash away their respective phase isotopes. These measurements are input into the computer 22 and processed to yield the desired flow parameters, denoted generically as $V_a$, $V_b$ and $V_c$ to the recorders 120, 122, and 124, respectively.

In an alternate embodiment of the invent, multiple membranes can be replaced with a single membrane which is partitioned having a single phase isotope deposited on a single partition. As an example, the membranes 114, 116 and 118 can be replaced with a single membrane (not shown), wherein the water soluble phase isotope is deposited upon one portion of this membrane, the oil soluble phase isotope is deposited upon a second portion of this membrane, and the gas soluble phase isotope is deposited upon a third portion of this membrane. A single membrane may readily support only two phase specific deposited isotopes.

SUMMARY

The above disclosure presents a multi-phase fluid flow measuring systems which meets all of the stated objects of the invention. While the foregoing disclosure is directed to the preferred embodiments of the invention, the scope thereof is determined by the claims which follow.

What is claimed is:

1. An apparatus for measuring a flow rate parameter of a fluid flow, comprising:
   (a) an insert; and
   (b) radioactive material deposited upon said insert, wherein said flow rate parameter is determined from a measure of the rate at which said radioactive material is washed from said insert by said fluid flow.

2. The apparatus of claim 1 further comprising a detector positioned sufficiently close to said insert to measure the activity level of said radioactive material on said insert.

3. The apparatus of claim 2 wherein said radioactive material decays by the emission of photons, and said detector measures said rate at which said radioactive material is washed from said insert by detecting said photons.

4. The apparatus of claim 3 wherein said radioactive material emits positrons which annihilate to produce coincident photons, and said detector measures said rate at which said radioactive material is washed from said insert by detecting said coincident photon emissions.

5. The apparatus of claim 1 wherein said insert comprises a membrane.

6. The apparatus of claim 5 wherein an exempt radioactive material is deposited on said membrane.

7. The apparatus of claim 1 wherein said flow rate parameter is determined by a predetermined relationship from measurement of the rate at which said radioactive material is washed from said insert by said fluid flow, wherein said predetermined relationship is determined by;
   (a) flowing a known amount of fluid at a known flow rate through said apparatus; and
   (b) measuring the rate at which said known amount of fluid at said known flow rate washes said radioactive material from said insert.

8. The apparatus of claim 1 wherein said flow rate parameter is volumetric or mass flow rate.

9. The apparatus of claim 1 including a coincident external detector positioned to detect material radiation.

10. The apparatus of claim 1 wherein said flow rate parameter is volume flow rate of a phase of a multiphase fluid.

11. An apparatus for measuring one or more phase flow parameters of a multi-phase fluid flow, comprising:
   (a) at least one insert; and
   (b) radioactive phase isotope material deposited upon said at least one insert, wherein:
   (c) said phase isotope is soluble in only one phase of said multi-phase flow; and (d) said flow parameter of said phase is determined from a measure of the rate at which said phase isotope is washed from said insert by said one phase of said fluid flow.

12. The apparatus of claim 11 further comprising a detector positioned sufficiently close to said at least one insert to measure the activity level of said phase isotope on said insert.

13. The apparatus of claim 12 comprising two or more phase isotopes, wherein each phase isotope is soluble in only one phase of said multi-phase flow.

14. The apparatus of claim 13 comprising two or more inserts, wherein a single one of said phase isotopes is deposited on a single said insert.

15. The apparatus of claim 14 wherein said two or more inserts comprises membrane material.

16. The apparatus of claim 15 wherein a single said phase isotopes is absorbed on a single membrane.

17. The apparatus of claim 13 wherein each said phase isotopes decays by the emission of photons of characteristic energy, and said detector measures said rate at which each said phase isotopes are washed from at least one said insert by detecting said photons of characteristic energy.

18. The apparatus of claim 17 wherein each said phase isotope emits coincident photons, and said detector measures said rate at which said phase isotopes are washed from said at least one insert by detecting said coincident photon emissions.

19. The apparatus of claim 11 wherein said one or more phase flow parameters of a multi-phase fluid flow are determined in accordance with predetermined relationships from said measured rates at which said phase isotopes are washed from said at least one insert, wherein said predetermined relationships are determined by;

(a) flowing a known amount of each phase fluid through said apparatus; and (b) measuring the rate at which said known amount of phase fluid washes said corresponding soluble phase isotope from at least one said insert.

20. The apparatus of claim 19 further comprising a computer, wherein said measured rates at which said phase isotopes are washed from said at least one insert are combined with said predetermined relationships, by said computer to obtain said flow parameters.

21. The apparatus of claim 20 comprising three inserts and three phase isotopes.

22. The apparatus of claim 11 wherein said one or more phase flow parameters is the volumetric flow rate of one or more phases of said multi-phase fluid.

23. The apparatus of claim 11 wherein said one or more phase flow parameters is the mass flow rate of one or more phases of said multi-phase fluid.

24. The apparatus of claim 11 wherein said multi-phase fluid comprises oil, water, and gas.

25. A method for measuring a flow rate parameter of a fluid flow, comprising the steps of:

(a) depositing radioactive material on an insert;

(b) placing said insert into said fluid flow;

(c) measuring the rate at which said radioactive material is washed from said insert by said fluid flow; and (d) determining said flow rate parameter from said measured rate.

26. The method of claim 25 further comprising the step of positioning of a detector sufficiently close to said insert to measure the activity level of said radioactive material on said insert.

27. The method of claim 26 further comprising the step of measuring said rate at which said radioactive material is washed from said insert by detecting photon emission.

28. The method of claim 27 further comprising the step of measuring said rate at which said radioactive material is washed from said insert by detecting coincident photon emissions.

29. The method of claim 25 comprising the additional steps of:

(a) deriving a quantitative value of said flow rate parameter by measuring the rate radioactive material on said insert;

(b) using said predetermined relationship to convert said measured rate into said quantitative value, wherein said relationship is determined by;

(c) flowing a known amount of fluid at a known flow rate through said apparatus; and (d) measuring the rate at which said known amount of fluid washes said radioactive material from said insert.

30. The method of claim 24 wherein said flow parameter is volumetric flow rate.

31. The method of claim 25 wherein said measured parameter is mass flow rate.

32. The method of claim 25 wherein said flow rate parameter is volume flow rate of a phase of a multiphase fluid.

33. A method for measuring one or more phase flow parameters of a multi-phase fluid flow, comprising the steps of:

(a) providing at least one insert; and (b) depositing radioactive phase isotope material upon said at least one insert, wherein:

(c) said phase isotope is soluble in only one phase of said multi-phase flow; and (d) said flow parameter of said phase is determined from a measure of the rate at which said phase isotope is washed from said insert by said phase of said fluid flow.

34. The method of claim 33 further comprising the step of depositing two or more phase isotopes upon at least one said insert, wherein each phase isotope is soluble in only one phase of said multi-phase flow.

35. The method of claim 34 comprising the additional step of positioning a detector sufficiently close to said at least one insert to measure the activity level of said two or more phase isotope on said at least one insert.

36. The method of claim 34 comprising the additional step of providing two or more inserts, wherein a single said phase isotope is deposited on a single said insert.

37. The method of claim 36 wherein said two or more inserts comprises membrane material.

38. The method of claim 37 wherein a single one of said phase isotopes is absorbed on a single membrane.

39. The method of claim 34 wherein each said phase isotope decays by the emission of photons of characteristic energy, and said detector measures said rate at which each said phase isotope is washed from at least one said insert by detecting said photons of characteristic energy.

40. The method of claim 39 wherein each said phase isotope emits coincident photons, and said detector measures said rate at which said phase isotopes are washed from said at least one insert by detecting said coincident photon emissions.

41. The method of claim 33 including the additional step of determining said one or more phase flow parameters of a multi-phase fluid flow, using predetermined relationships and said measured rates at which said phase isotopes are washed from said at least one insert, wherein said predetermined relationships are determined by;
  (a) flowing a known amount of each phase fluid through said apparatus; and
  (b) measuring the rate at which said known amount of phase fluid washes said corresponding phase isotope from at least one of said inserts.

42. The method of claim 33 wherein;
  (a) said multi-phase flow comprises oil, water, and gas;
  (b) three inserts are provided; and
  (c) three phase isotopes are provided, wherein a single phase isotope is deposited upon a single insert.

* * * * *